J. E. WRIGHT.
PRINTING TELEGRAPH.
APPLICATION FILED JAN. 15, 1916. RENEWED MAR. 8, 1917.

1,223,463.

Patented Apr. 24, 1917.

Inventor
J. E. Wright
By his Attorneys
Kerr Page Cooper & Hayward

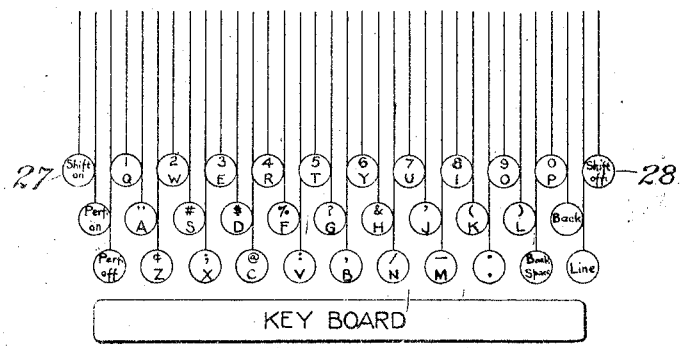

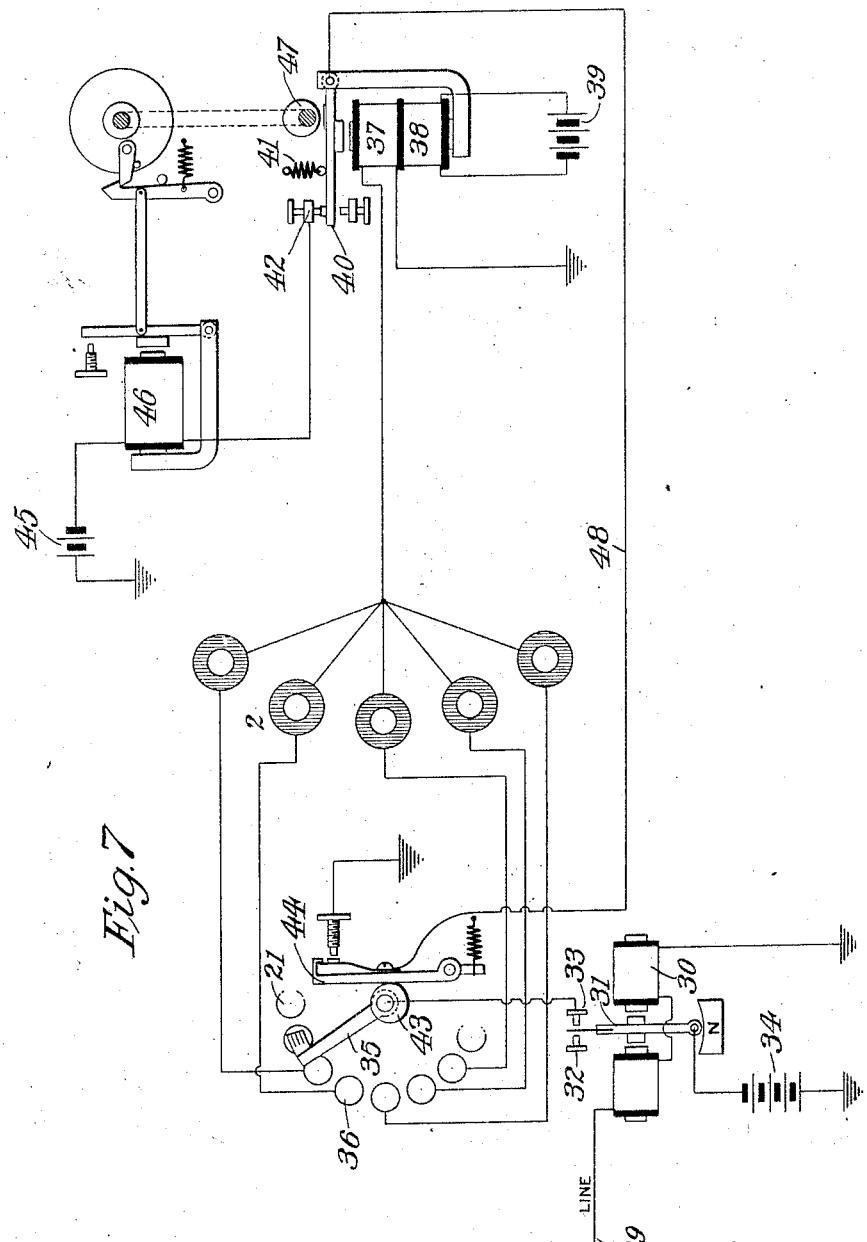

UNITED STATES PATENT OFFICE.

JOHN E. WRIGHT, OF NEW YORK, N. Y.

PRINTING-TELEGRAPH.

1,223,463.  Specification of Letters Patent.  Patented Apr. 24, 1917.

Application filed January 15, 1916, Serial No. 72,220. Renewed March 8, 1917. Serial No. 153,240.

*To all whom it may concern:*

Be it known that I, JOHN E. WRIGHT, a citizen of the United States, residing at New York, in the county and State of New York, have invented certain new and useful Improvements in Printing-Telegraphs, of which the following is a full, clear, and exact description.

In the printing telegraph system heretofore devised by me, the operation of the receiving apparatus was controlled by transmitted groups of signal impulses corresponding to what is known as the Baudot code, and composed of six units. For example, each character, whether letter or figure, is brought to the printing position and impressed by means of six timed impulses or one or more of such impulses occurring at definite intervals of time allotted for the group.

These groups of impulses or units, whether composed of currents of short duration, or their corresponding timed intervals, are transmitted and received through the segments of synchronously operating sun-flower instruments and caused to influence appropriate electro-magnets which operate what is known as a translator, the mechanism of which is adjusted by the received groups of impulses to positions or conditions corresponding to such group and adapted by such adjustment to bring to the printing position corresponding characters on a type wheel, and print the same, or to otherwise affect the registry or printing of such characters or other operations of the machine.

The translator connected with this system is itself of peculiar and novel construction, and comprises a limited number of levers dependent for position upon the adjustment of permutation bars for controlling the position of the type-wheel along its shaft or spindle and a considerably greater number of similar levers, some adapted to act alone and others to act in conjunction with other levers to control the rotation of the type wheel and to effect the other operations necessary in the machine. The translator as a whole may therefore be regarded as a combination of levers and permutation bars that are divided into sets of limited number some acting alone and others in conjunction with other levers, and the main object of the invention of my present application is to modify this device and adapt it for use in another system as will be hereinafter described.

In certain systems, notably of multiplex transmission, wherein each of a certain number of transmitting and corresponding receiving instruments is successively connected for a definite period of time with the line, working to full capacity requires that a character group of impulses be transmitted during each successive line connection, so that assuming there are, say, four transmitters, each cycle of operation of the means for successively connecting them to line, would result in the sending of twenty-four impulses or units, providing each group were composed of six units.

This is a serious obstacle to the use of such instruments under the conditions assumed, as the consideration of time in transmission becomes of controlling importance, and it is obvious that since the intervals of connection with the line must necessarily be extremely brief, the number of impulses sent during each interval should be as few as possible. It is, however, necessary, in order to secure the number of permutations required in general and particularly in the system of telegraphy above described, to have as large a number of current impulses in each group as possible, and with these objects in view, and to obviate the objection to groups of six or more units, I have so modified the instruments heretofore made by me that they become five unit devices instead of six, whereby they are made much more available for use and operation in such systems as are above outlined.

In order to accomplish this result, each of a certain number of characters is produced by groups of five units, and the remaining characters are produced by the operation of an additional permutation element, shifted, not by an electro-magnet, of which there are but five, instead of six, but by a group of impulses sent by a special shift key, and returned to normal position after utilization in its shifted position by another group of impulses sent by a second special shift key.

This method of operation therefore requires three groups of impulses, instead of one, to be sent for, say, one-half of all the characters or operations which the apparatus may be capable of printing or performing, one to operate the special permutation element, one to print the character, and the other to restore the element to its normal position.

This, however, is not a serious objection as the transmission of the impulses over the line may and usually is effected, by the use of a perforated tape, in which case the rate of transmission for which the instruments are adjusted may always be maintained, or in case no tape be used, may be very closely approximated by hand sending.

In the accompanying drawings I have illustrated so much of the mechanism of my improved system as is necessary to an understanding of the present invention, and have appended certain diagrams to illustrate the principle of operation involved in my improved five-unit system.

Fig. 4 is a development of the type-wheel employed.

Fig. 5 is a diagrammatic illustration of the key-board.

Fig. 6 is a diagram showing the various characters and operations, and the groups of impulses which are transmitted to produce them, and Fig. 7 is a diagram of the circuits and instrumentalities used in carrying out the invention.

Figure 1:
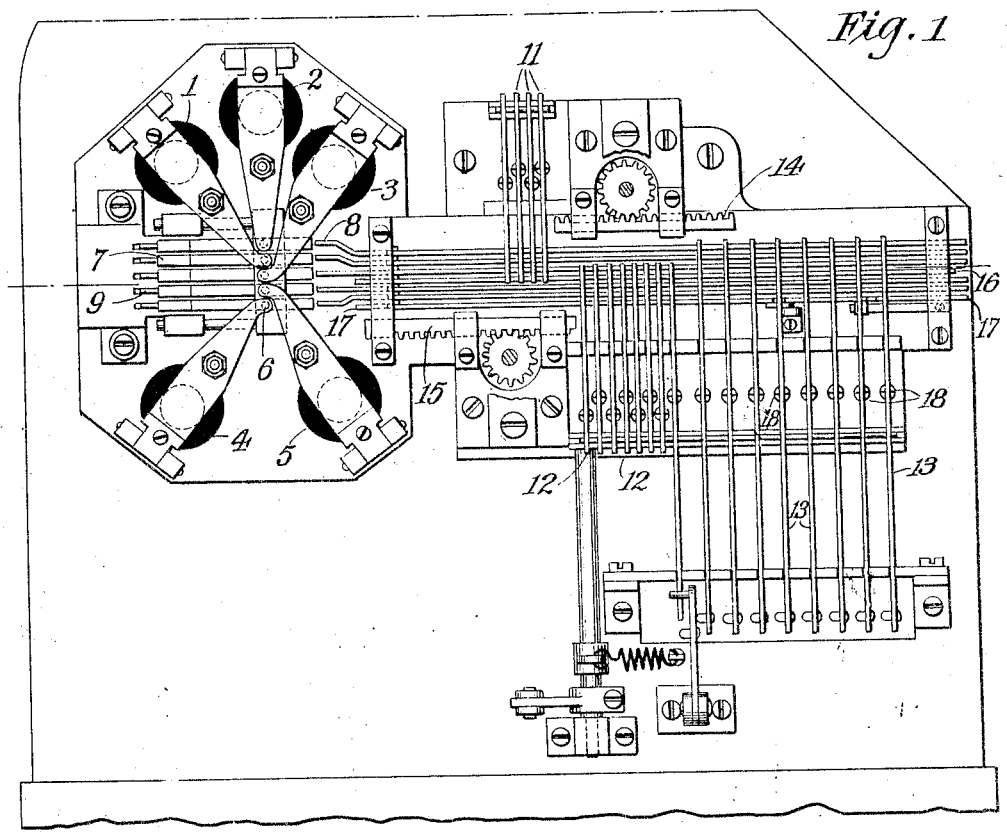
Figure 1 is a top plan view of that portion of the translator, which it is understood is merely a portion of the receiving devices, to which the novel feature characterizing my invention is applied.
Figure 2:
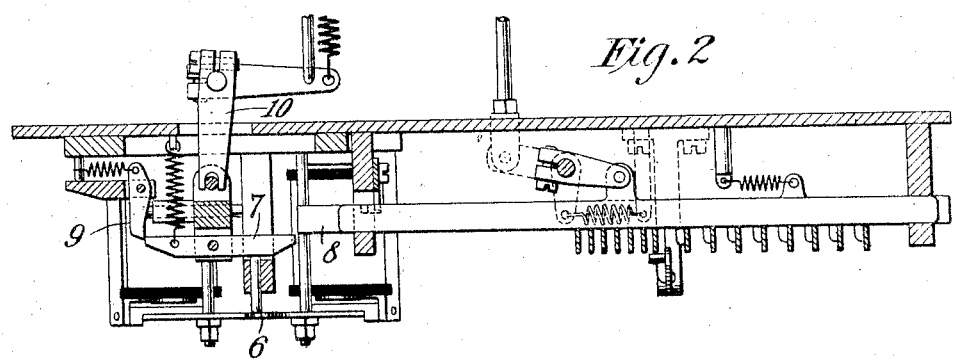
Fig. 2 is a detail view of some of these and other parts of the instrument inverted.
Figure 3:
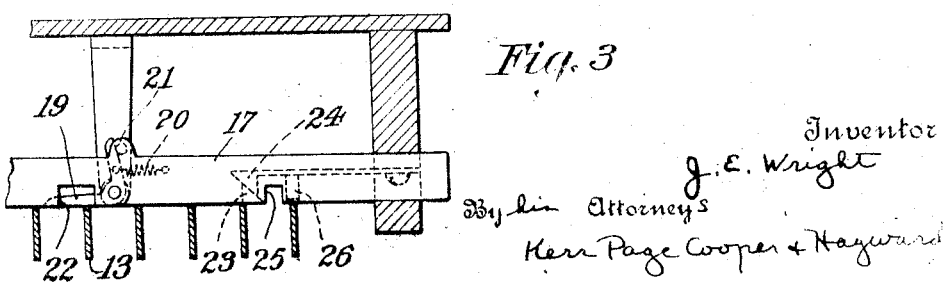
Fig. 3 is an enlarged detail of the means for shifting the special permutation element.

Referring to Fig. 1, the numerals 1, 2, 3, 4 and 5, indicate five electro-magnets through which the transmitted impulses of current, according to their time relation to their respective groups are directed. When any one or more of these magnets is energized, its armature pushes a pin 6 which moves the end of a lever 7 into line with the permutation bar or element 8, and leaves it in that position by reason of the engagement with its opposite end of a catch 9.

There are five levers 7, and five permutation bars or elements 8, so that when the levers 7 are moved bodily in the direction of the bars 8 by a lever 10, those levers 7 which are latched in their shifted position will push forward the permutation bars in line with them. As is well understood, although the details of this construction are not fully illustrated herein, the bars 8 have notches along their upper edge into which one or more of the fingers or levers 11, 12 and 13 drop when a row or line of such notches is formed under one of these levers by the movement or adjustment of the bars by the levers 7. These devices may be of any proper character or construction adapted for the purpose.

That finger 11 which drops, limits the movement of the usual type-wheel raising rack-bar 14. That finger 12 which is dropped in a similar manner, limits the movement of the type-wheel turning rack-bar 15, and the other fingers perform different functions which need not be here set forth.

In addition to the permutation bars 8, moved by the magnets, there is the usual bar 16, employed in this type of machine, which by suitable mechanism, not illustrated in this drawing, is moved to restore to normal position the dropped fingers, 11, 12 or 13 after each operation of the machine, and an additional permutation bar 17, which is not shifted by any magnet, but is operated by the following means.

When the bars are adjusted by their respective magnets so that a line or row of notches falls under the fifth finger 13, counting from the right, that finger falls into the alined notches, and being acted upon by a spring 18, engages and shifts the tail of a bell crank lever 19, the other end of which, by a light spring 20, is held in contact with a pin 21 on the side of the bar 17. This moves the bar 17 forward, the notch 22 therein being sufficiently wide to permit this without coming in contact with the finger 13.

The movement of the bar 17 causes a stop 23 thereon, which has a sloping face to engage and lift a light spring 24, having an end of corresponding contour over which the stop slides until the end of the spring has passed over the stop, and is engaged thereby. This locks the bar 17 in its forward position, and its notches will obviously have the same relation to those in the other bars that they would, were the bar 17 moved directly by a sixth magnet, so that, according to the position of the other bars, different rows of notches will thereby be alined, and different fingers 12 or 13, as the case may be, are dropped and the machine made to perform a corresponding operation.

To illustrate this operation, assume that a letter has been printed by the depression of the key corresponding thereto, and that the next character required is, say the numeral 3. The "shift on" key 27 is therefore depressed, which shifts the bar 17. The key bearing the numeral 3 is then depressed, which sends an impulse in the first time or unit interval, and one in the fourth, which combination forces two permutation bars forward, that, together with bar 17, which is already forward, permits that finger or fingers to drop that brings the character 3 to the printing position and impresses it in the usual manner.

If the next character to be printed is a letter, and not another numeral then the "shift off" key 28 is depressed which sends impulses in the third, fourth and fifth intervals, which, with bar 17 still in its forward position, brings a row of notches under a finger that enters notch 25 and encounters a projecting lug 26 on the spring 24, and raises the latter out of engagement with the stop 23, and permits the bar 17 to return to its normal position.

This operation is characteristic of all others which require the movement of the sixth permutation bar 17 in addition to one or more or all of the other bars in order to bring a row of notches under the appropriate fingers, such operations being indicated, when necessary, by the diagram of the keyboard and that of Fig. 6.

I have illustrated my invention herein in connection with a special machine of my own design, which is more fully set forth and described in an application, Serial Number 852807, filed July 24, 1914, but it is obvious that the novel feature is applicable generally to all forms of instrument in which permutation elements are set by the action of six or more electro-magnets in a similar manner, for in lieu of using such a magnet for each element, fewer magnets, not less than five, whether one or more is immaterial, may be employed, thus reducing the number of units of the groups of impulses transmitted over the line to five, and operating one or more of the permutation elements by special groups of impulses sent through the magnets, subtantially in the manner hereinbefore set forth.

Instruments of the class hereinbefore described are particularly applicable to multiplex systems in which two, three or more transmitters and receivers are operated over the same line wire. In such systems there is employed, as is well known, at each end of the line a means for establishing the conditions by which currents may be transmitted from one of the key-boards or transmitters proper of each set of instruments to its appropriate receiving instrument at the distant station during given and regularly recurring intervals of time. For example, if there be four sets of instruments, there will be employed at each station a circular series of contacts and a continuously rotating contact brush, the movements of which will be in exact synchronism at the two stations and, for purposes now of illustration merely, five of these contacts at one station are successively connected with one key board, five with the next and so on. Similarly at the receiving end of the line five contacts corresponding to those first mentioned are simultaneously connected to the five magnets of the first receiver, five to those of the next receiver and so on, so that for each rotation of the contact brush, if there be four sets of instruments, each set will be operative for sending and receiving signals during one quarter of the time occupied by such rotation.

There may, however, be other contacts at both stations than those used for operating the magnets, and it is undesirable that any receiving instrument should be operated to print or for any other purpose involved in the transmission of character signals, unless the current is sent and received through one of the contacts connected with a group of five magnets, and for this purpose I have devised the plan illustrated in Fig. 7.

In this case 29 is the line wire leading to the receiver,—one end only of the system being shown. In this circuit is a relay magnet 30, the line after passing the relay running to ground. The armature 31 of the relay normally rests upon the back stop 32, but when a signal impulse comes over the line the armature is shifted on to the front stop 33.

When the armature is shifted by a received impulse on the stop 33 the battery 34 is connected with the rotating brush 35 and an impulse of current is sent through that contact with which it may then be in engagement. Assume that this is contact 36, including magnet 2. The current passes through one of the coils 37 of an electromagnet with two coils, the second of which 38 is permanently energized by a local battery 39 and being opposed to the current in the other coil the impulse which proceeds from the magnet 2 nullifies the action in the coil 38 and permits the armature 40, acted upon by spring 41 to rise into contact with stop 42 and pass beyond the attractive effect of the coil 38. The armature therefore remains in engagement with stop 42 and hence when a cam 43 on the shaft of the rotary brush 35 moves contact lever 44, a circuit will be made from battery 45, through magnet 46, which controls the operation of the receiving instrument, armature 40, wire 48 and lever 44 to ground, and the receiving instrument is operated, with the result that by its operation a cam 47 on one of the receiver shafts is caused to depress the armature 40, forcing it down to where the magnetic attraction of the coil 39 will be sufficient to hold it away from the stop 42.

Should no current impulse, however, have passed through one of the magnets, the armature 40 is not released or shifted and hence when the cam 43 operates the lever 44 no path for current through the receiving instrument will be closed. It will thus be seen that unless one of the selecting magnets of the translator receives a current impulse, the receiver to which they appertain will not be affected or operated by current impulses passing over the line.

What I claim is:

1. In a printing or telegraph system, the combination with a series of permutation elements in a translator, of magnets for controlling the adjustment or position of certain of such elements, of means controlled in operation by the effect of line impulses and the adjustment of one or more of such elements to shift or adjust the position of another permutation element and devices or fingers divided into sets for controlling the lifting and turning of a type-wheel and the other operations of the machine adapted to respond to the adjustment of the permutation elements by the means described.

2. In a printing or similar telegraph system, the combination with a series of permutation elements of a translator, of magnets for directly shifting or adjusting all of such elements but one, means dependent upon line impulses and the direct adjustment of the permutation elements for its operation to set or adjust said one element, and fingers or like device coöperating with all of said elements for controlling the rotary and longitudinal movements of the type-wheel and the other operations necessary in the machine.

3. In a printing or similar telegraph receiving instrument, the combination with a group of permutation elements, of magnets for adjusting all but one of the same, of means dependent upon the adjustment of said elements for operation, and adapted when operated, to shift the said one element, means for locking that element in its shifted position, and means for restoring it to normal position, after utilization in its shifted position.

4. In a printing telegraph receiving instrument, the combination with a group of permutation elements, of a line controlled magnet adapted to shift or operate each element but one, a finger dependent for movement on the adjustment of the magnetically operated elements for shifting the said one element, means for locking the same when shifted, and means dependent upon the adjustment of all the elements for restoring the locked element to normal position.

5. In a printing telegraph receiving instrument, the combination with permutation bars and fingers dependent for movement upon the relative positions of said bars, line operated magnets for adjusting to position all of said bars but one, one of the fingers being adapted when moved to shift the said one bar, means for retaining the said bar in shifted position, and means for restoring it after utilization in its shifted position operated by the movement of another of said fingers.

6. In a printing or similar telegraphic system, the combination with a receiver and an electro-magnetic means for controlling the operation of the same, of a translator, a series of selecting magnets therein and an electro-magnet in a circuit common to all of the selecting magnets adapted to control the circuit of the electro-magnetic controlling means, whereby the receiver is rendered capable of operation only when a line current impulse passes through one of the selecting magnets of the translator.

7. In a printing or similar telegraphic system the combination with the receiver proper of an electro-magnetic means for controlling its operation, a translator, selecting magnets therein, a magnetic circuit closer in series with all of said magnets which is normally open and controls the circuit of the electro-magnetic controlling means, but adapted to be closed by the passing through it of a current impulse through any one or more of the selecting magnets whereby the receiver is rendered capable of operation only when an impulse of current traverses one or more of the selecting magnets.

8. In a printing or similar telegraphic system the combination with the receiver proper of an electro-magnetic means for controlling its operation, a translator, selecting magnets therein, a magnetic circuit controller in series with the selecting magnets and adapted to be closed by an impulse of current passing through any one or more of said magnets, said circuit controller being connected with the circuit of the electro-magnetic controlling means and a second circuit closer also in said circuit periodically operated to start the receiver in action.

In testimony whereof I affix my signature.

JOHN E. WRIGHT.